(12) United States Patent
Gordon et al.

(10) Patent No.: US 11,503,037 B2
(45) Date of Patent: Nov. 15, 2022

(54) NESTED ACCESS PRIVILEGE CHECK FOR MULTI-TENANT ORGANIZATIONS

(71) Applicant: Microsoft Technology Licensing, LLC

(72) Inventors: Ariel Gordon, Mercer Island, WA (US); Somak Bhattacharyya, Copland, WA (US); Manish Shukla, North Bend, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 353 days.

(21) Appl. No.: 16/672,882

(22) Filed: Nov. 4, 2019

(65) Prior Publication Data

US 2021/0136083 A1  May 6, 2021

(51) Int. Cl.
H04L 9/40 (2022.01)

(52) U.S. Cl.
CPC ........ *H04L 63/105* (2013.01); *H04L 63/0884* (2013.01); *H04L 63/101* (2013.01); *H04L 63/102* (2013.01); *H04L 63/104* (2013.01)

(58) Field of Classification Search
CPC . H04L 63/105; H04L 63/0884; H04L 63/101; H04L 63/102; H04L 63/104
See application file for complete search history.

(56) References Cited

U.S. PATENT DOCUMENTS

| | | | |
|---|---|---|---|
| 8,549,622 B2 | 10/2013 | Byrne et al. | |
| 8,782,748 B2 | 7/2014 | Olszewski et al. | |
| 8,875,166 B2 | 10/2014 | Plewnia | |
| 9,369,456 B2* | 6/2016 | Singh | H04L 63/0815 |
| 9,774,586 B1* | 9/2017 | Roche | H04L 63/08 |
| 10,044,723 B1* | 8/2018 | Fischer | H04L 63/102 |
| 10,250,612 B1* | 4/2019 | Raposa | H04L 63/108 |
| 10,592,302 B1* | 3/2020 | Hinrichs | H04L 63/10 |

(Continued)

OTHER PUBLICATIONS

J. Elwell, R. Riley, N. Abu-Ghazaleh and D. Ponomarev, "A Non-Inclusive Memory Permissions architecture for protection against cross-layer attacks," 2014 IEEE 20th International Symposium on High Performance Computer Architecture (HPCA), 2014, pp. 201-212, doi: 10.1109/HPCA.2014.6835931. (Year: 2014).*

(Continued)

*Primary Examiner* — Jung W Kim
*Assistant Examiner* — Sameera Wickramasuriya
(74) *Attorney, Agent, or Firm* — NovoTechIP International PLLC

(57) ABSTRACT

Techniques for managing access to content are provided that include receiving a first signal requesting an indication whether a user has an access privilege to access to a resource associated with a first tenant of an access management service or perform an operation by a data processing system using the resource, determining that a first user account associated with the user does not have an access privilege to access the resource; performing a nested access privilege check to determine whether the user is associated with a second user account that has the access privilege to access the resource; and granting via the communication network access to the resource responsive to the nested access privilege check determining that the user is associated with the second user account and the second user account is associated with the access privilege to access the resource.

20 Claims, 11 Drawing Sheets

(56) References Cited

U.S. PATENT DOCUMENTS

| | | | | |
|---|---|---|---|---|
| 10,819,750 | B1* | 10/2020 | Yawalkar | H04L 63/083 |
| 10,897,466 | B2* | 1/2021 | Sisley | H04L 63/08 |
| 10,972,444 | B1* | 4/2021 | Schiesser | H04L 63/10 |
| 11,108,828 | B1* | 8/2021 | Curtis | H04L 63/0263 |
| 2011/0302503 | A1 | 12/2011 | Cahill et al. | |
| 2012/0072716 | A1* | 3/2012 | Hu | G06F 21/602 |
| | | | | 713/189 |
| 2014/0280939 | A1* | 9/2014 | Banatwala | H04L 63/20 |
| | | | | 709/225 |
| 2016/0173475 | A1* | 6/2016 | Srinivasan | H04L 63/08 |
| | | | | 726/6 |
| 2016/0253198 | A1* | 9/2016 | Gallant | G06F 9/45558 |
| | | | | 718/1 |
| 2016/0337365 | A1* | 11/2016 | Beiter | G06F 9/468 |
| 2019/0014120 | A1* | 1/2019 | Drabant | H04L 63/104 |
| 2021/0099301 | A1* | 4/2021 | Busjaeger | G06F 9/5072 |

OTHER PUBLICATIONS

A. Ranjbar, M. Antikainen and T. Aura, "Domain Isolation in a Multi-tenant Software-Defined Network," 2015 IEEE/ACM 8th International Conference on Utility and Cloud Computing (UCC), 2015, pp. 16-25, doi: 10.1109/UCC.2015.16. (Year: 2015).*

"Best Practices for Enterprise Organizations", Retrieved From: https://web.archive.org/web/20190729161037/https:/cloud.google.com/docs/enterprise/best-practices-for-enterprise-organizations, Retrieved on: Jul. 29, 2019, 22 Pages.

"Manage Groups", Retrieved From: https://web.archive.org/web/20180808104404/https:/help.okta.com/en/prod/Content/Topics/Directory/Directory_Groups.htm, Retrieved on: Aug. 8, 2018, 3 Pages.

Alam, et al., "A Cross Tenant Access Control (CTAC) Model for Cloud Computing: Formal Specification and Verification", In Journal of IEEE Transactions on Information Forensics and Security, vol. 12, No. 6, Jun. 2017, pp. 1259-1268.

Holtzman, et al., "About Multiple Online Instances or Tenants", Retrieved From: https://docs.microsoft.com/en-us/dynamics365/customer-engagement/admin/multiple-online-instances-tenants, Sep. 30, 2017, 9 Pages.

Ross, et al., "What is Group-based Licensing in Azure Active Directory?", Retrieved From: https://docs.microsoft.com/en-us/azure/active-directory/fundamentals/active-directory-licensing-whatis-azure-portal#licensing-requirements, Oct. 29, 2018, 3 Pages.

"International Search Report and Written Opinion Issued in PCT Application No. PCT/US20/056232", dated Feb. 3, 2021, 12 Pages.

* cited by examiner

User A 111

| Field | Value |
|---|---|
| Object ID: | 19011212४575933 |
| Tenant ID: | 128765554 |
| Username: | userA@tenantA.com |
| Name: | User A |
| Role: | Member |
| Authentication Credentials: | password111 |
| Access Privileges: | Access Privilege A 201 |
| | Access Privilege B 202 |
| Linked Account ID: | None |

User A – Shadow Account 301

| Field | Value |
|---|---|
| Object ID: | 6913461651753393 |
| Tenant ID: | 1356776५798 |
| Username: | userA@tenantB.com |
| Name: | User A |
| Role: | Member |
| Authentication Credentials: | None |
| Access Privileges: | None |
| Linked Account ID: | @128765554@19011212४575933 |

FIG. 11

NESTED ACCESS PRIVILEGE CHECK FOR MULTI-TENANT ORGANIZATIONS

BACKGROUND

Managing access to software and other resources in large organizations is a complex process. Users may join and leave the organization, requiring purchasing of additional licenses or reassigning licenses as users leave the organization. Some organizations may be divided into multiple sub-entities for which software licenses are purchased. When a user from one sub-entity of the organization needs to share a licensed resource with a user from another sub-entity of the organization, licensing constraints and other access privileges may prevent users from being able to cooperate across organizational boundaries. There are significant areas for new and approved mechanisms for handling access privileges to resources in multi-tenant organizations.

SUMMARY

An example computing device according to a first aspect of the invention includes a processor and a computer-readable medium. The computer-readable medium stores executable instructions for causing the processor to perform operations comprising: receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

An example method executed by a data processing system for managing access to resources managed by an access management service according to a second aspect of the invention includes receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

An example memory device according to a third aspect of the invention stores instructions that, when executed on a processor of a computing device, cause the computing device to manage access to resources managed by an access management service by receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example

FIG. 11 is a block diagram illustrating an example of a user account data.

DETAILED DESCRIPTION

Figure 1:
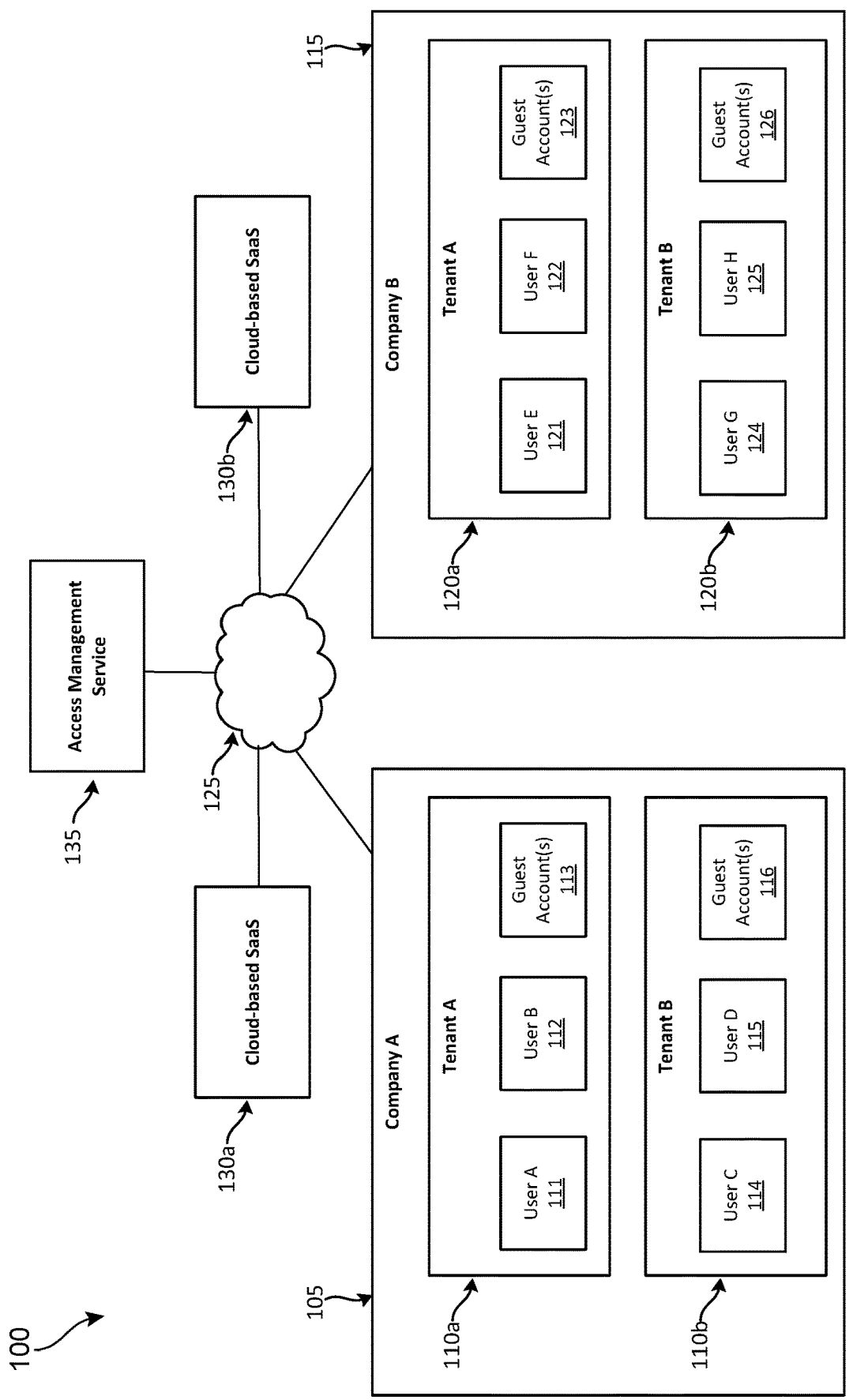
FIG. 1 presents an example operating environment in which techniques for performing a nested license check may be performed.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for managing access to resources in a multi-tenant environment managed by an access management service are provided. An access management service provides means for an organization (e.g., a company, a university, a government agency, or other entity) for managing user access to resources associated with the access management service. These resources may include resources internal to the organization, such as internal applications developed for use within the organization, an Intranet site, and/or other resources that may be accessed by users within the organization. The resources managed by the access management service may include external resources, such as cloud-based software applications and other external resources that users of the organization may be permitted to access. The access management service may be divided into logical "tenants" of the access management services that each have their own set of user accounts, resources, licenses, and policies associated with them. Each tenant is managed as a separate entity by the access management service, and ideally, each organization would be associated with a single tenant in the organization in which all of the users associated with that organization would be included in a single tenant. This single tenant approach per organization would make collaboration between users of the organization much simpler, as the all of the organization's resources would be organized into a single tenant on the access management service. However, in reality many organizations have multiple divisions or other sub-entities, and each division or other sub-entity may have its own tenant in the access management services for various reasons discussed in the examples that follow. This can make it difficult for users whose user accounts are homed in different tenants to collaborate with one another, because access to software and other resources is typically restricted users who have users accounts within the tenant.

One way to address these problems is to set up multiple accounts for users in multiple tenants associated with the organization to permit the user to access resources homed in different tenants associated with the organization. A user may have a primary user account in their home tenant with which the user is primarily affiliated. For example, the user's primary user account may be established in a tenant associated with a division of the organization for which the user is an employee. A user may also have one or more "shadow" accounts which are set up in other tenants of the organization. The shadow accounts allow the user to be authenticated with the other tenant and to access resources therein. However, this approach creates significant technical problems for administrators of the organization, who must administer multiple accounts for users. A large organization may include thousands of users and different resources in each tenant. Thousands of shadow accounts may be required to represent users in other tenants associated with the same organization to permit the users to be able to access the resources homed to those other tenants.

Authentication and the overhead associated with maintaining a huge number of shadow accounts is just technical problem that arises in multi-tenant organizations. Other significant technical problem is the management of software licenses and other such access privileges that allow a user to access resources, such as a software application, associated with a particular tenant. In conventional multi-tenant configurations of access management services, the software licenses and/or other such access privileges to access resources are typically limited to a single tenant. As a result, a user may need multiple copies of the same software license or other access privilege assigned to each of the shadow accounts across multiple tenants for the user to be able to utilize that resource across multiple tenants. This create a significant technical problem for administrators of such a multi-tenant organization, because of the significant overhead of managing multiple licenses and/or access privileges for users across each of the tenants. Furthermore, the cost of obtaining multiple licenses for the same user may be quite significant, and the administrator may need to attempt to obtain discounted or free licenses or other access privileges from software providers to avoid having to pay for multiple licenses or other access privileges for the same resource for each user. The techniques disclosed herein provide a technical solution to these and other technical problems faced by administrators in multi-tenant organizations by providing a nested license check that can access user accounts that have been linked or mapped together across tenants. The nested access privilege check can check each of the user's accounts in multiple tenants within the same organization to determine whether the user has a valid license to access the resource or other access privilege associated with at least one of the user's user accounts. If a valid license or other access privilege to access a requested resource is found to be associated to at least one of the user's users accounts within the multiple tenants of the organization, the user will be granted access to the request resource. This approach provides a technical solution that can significantly reduce or eliminate the need to maintain multiple copies of software licenses and/or other access privileges for the same user in the organization. This technical solution may greatly simplify the maintenance of user accounts and reduce operating costs by eliminating unnecessary duplicate copies of software licenses that would have been required in conventional access management services.

FIG. 1 presents an example operating environment 100 in which techniques for performing a nested access privilege check may be performed. The operating environment includes an access management service 135, a first cloud-based software as a service (SaaS) provider 130a, a second SaaS provider 130b, a first organization 105, and a second organization 115.

The access management service 135 is a cloud-based access management service may provide a means for managing an organization's users' access to various resources including internal and external resources. External resource may include SaaS applications which are not provided by the organization. Internal resources may include applications on the organization's network and intranet and cloud-based applications developed by the organization. The access management service 135 may be implemented by Microsoft Azure Active Directory (Azure AD) in some implementations and other access management services may be used to implement the access management service 135 in other implementations.

The access management service 135 may also provide identity management services for verifying an identity of a user. For example, the first SaaS provider 130a and/or the second SaaS provider 130b may outsource authentication to the access management service 135. The SaaS providers 130a and 130b may register with the access management service 135, and the access management service 135 may be configured to register each application provided by the SaaS providers 130a and 130b in a "directory" maintained by the access management service 135 for each "tenant" of the access management service 135. The directory may include information identifying the users, user groups, and applications associated with the tenant. A tenant may be an organization or a sub-entity of an organization, as will be discussed further in the examples that follow. The access management service 135 may be configured to support various authentication protocols, such as but not limited to OAuth 2.0, OpenID Connect, WS-Federation, and SAML 2.0. The specific flow of request and responses that pass between the access management service 135 will depend upon the authentication protocol that is selected when registering an application with the access management service 135.

The access management service 135 can also be configured to allow an administrator to define a set of access privileges associated with each user account of the tenant. The access privileges may be used by the access management service 135 to determine whether a particular user is permitted to access a resource managed by the access management service 135. The resources managed by the access management service 135 may include software that is licensed, and the access privileges may include software licenses that permit a user to access a software application associated with a particular license. Software licenses may be assigned to specific user accounts and/or may be assigned to groups of users ("group licensing") who may use a license from a pool of licenses assigned to the group to access the software associated with the license.

The first and second SaaS providers 130a and 130b provide a cloud-based software service in which the software is delivered online rather than being installed on individual computers. The first and second SaaS providers 130a and 130b may provide various applications and services online. Access to the software provided by the first and second SaaS providers may be a subscription-based service in which a user purchases a license to use one or more software products provided each SaaS provider. The first and second SaaS providers 130a and 130b may be configured to use the access management service 135 to perform license management in which the first and second SaaS providers 130a and 130b rely on the access management service 135 to verify whether a user has a valid license to access the software provided by the first and second SaaS providers 130a and 130b. The first and second SaaS provider 130a and 130b may provide various types of software, such as document editors, spreadsheet editors, photo editors, and/or other software products that are made available as cloud-based software. Examples of such applications and services may include but are not limited to Microsoft Office 365 and Microsoft Azure.

The access management service 135, the first and second SaaS providers 130a and 130b, the first organization 105, and the second organization 115 may communicate over the network 125. The network 125 may comprise one or more public and/or private networks and may include a least in part the Internet.

FIG. 1 includes two example organizations that are used to illustrate the concepts of managing access privileges in a multi-tenant environment disclosed herein. The specific structure and organization of these example multi-tenant organization are in no way limiting.

The access management service 135 may be configured to support one or more logical domains referred to as "tenants." Each tenant may be associated with one or more user accounts, and a user may have accounts in more than one tenant. Each user may be associated with access privileges the define which resources that use may access internally within the tenant and externally. As discussed in the examples which follow, the access privileges associated with a user account may include one or more software licenses that permit the user associated with the user account to access a particular software application.

In multi-divisional organizations, such as the first organization 105 and the second organization 115 illustrated in FIG. 1, each division may be set up as a separate tenant on the access management service 135. Organizations having more than one tenant on the access management services 115 may result from mergers and acquisitions. An organization which is already a tenant of the access management service 135 acquires another organization which is also already a tenant of the access management service 135 resulting in the organization having multiple tenants in the access management service 135. Multi-tenant configurations within an organization also may be the result of different business units of the organization each separately migrating to cloud-based software solutions separately instead of migrating the entire organization as a whole. Each business unit then becomes a separate tenant on the access management service 135. As will be discussed in the examples that follow, such a multi-tenant configuration with an organization can make collaboration across tenants of the multi-tenant organization cumbersome.

The first organization 105 is in this example is a corporation also referred to herein as "Company A." The first organization 105 includes a first division having a first tenant 110a and a second division having a second tenant 110b of the access management service 135. The first tenant 110a includes a first user account 111 for User A, a second user account 112 for User B, and guest account(s) 113. The first user account 111 and the second user account 112 are member accounts have the ability to create content in the tenant and to invite other users to collaborate on content. The guest account(s) 113 have more limited accesses to resources of the tenant and may not be permitted to create new content and may not be permitted to invite other users to collaborate on content.

The first user account 111 (User A) and the second user account 112 (User B) may each be assigned one or more access privileges. The access privileges may be used by the access management service 135 to determine whether User A and User B are permitted to access resources managed by the access management service 135. The access privilege may be related to external and/or internal resources. External resources may include resources that are provided from outside of the organization, such as the SaaS applications provided by first and second SaaS providers 130a and 130b. Internal resources may include resources that are provided from within the organization, such as applications that are provided on an internal network or intranet of the organization and cloud-based applications developed by the organization.

The access privileges may include software licenses that allow the user to access software applications. In the example illustrated in FIG. 1, the access privileges associated with the users may include licenses for the first SaaS provider 130a, the second SaaS provider 130b, and/or other software applications of other software providers. The second tenant 110b of the first organization 105 includes a first user account 114 for User C, a second user account 115 for User D, and guest account(s) 116. The first user account 114 (User C) and the second user account 115 (User D) may each be assigned one or more access privileges. These access privileges may include software licenses, such as licenses for applications provided by the first SaaS provider 130a, the second SaaS provider 130b, and/or software providers. The guest account(s) 113 may be associated with a pool of software licenses that may be assigned to guest users of the first tenant 110a of the first organization 105, and the guest account(s) 116 may be associated with a pool of software licenses that may be assigned to guest users of the second tenant 110b of the first organization 105.

The second organization 115 is in this example is a corporation referred to as "Company B." The second organization 115 includes a first division having a first tenant 120a and a second division having a second tenant 120b on the access management service 135. The first tenant 120a includes a first user account 121 for User E, a second user account 122 for User F, and guest account(s) 123. The second tenant 120b includes a first user account 124 for User G, a second user account 125 for User H, and guest account(s) 126. User accounts 121, 122, 124, and 125 are member accounts. Each of the user accounts and the guest accounts may be associated with one or more access privileges, which may include one or more software licenses.

The example organizations 105 and 115 illustrated in this example each have two divisions. However, other organizations may have more than two divisions, and users from a first division may wish to collaborate with users from more than one other division. These examples and the examples that follow are in no way limiting and are intended to illustrate examples of how the nested access privilege checking may be implemented by the access management service 135.

Figure 2:
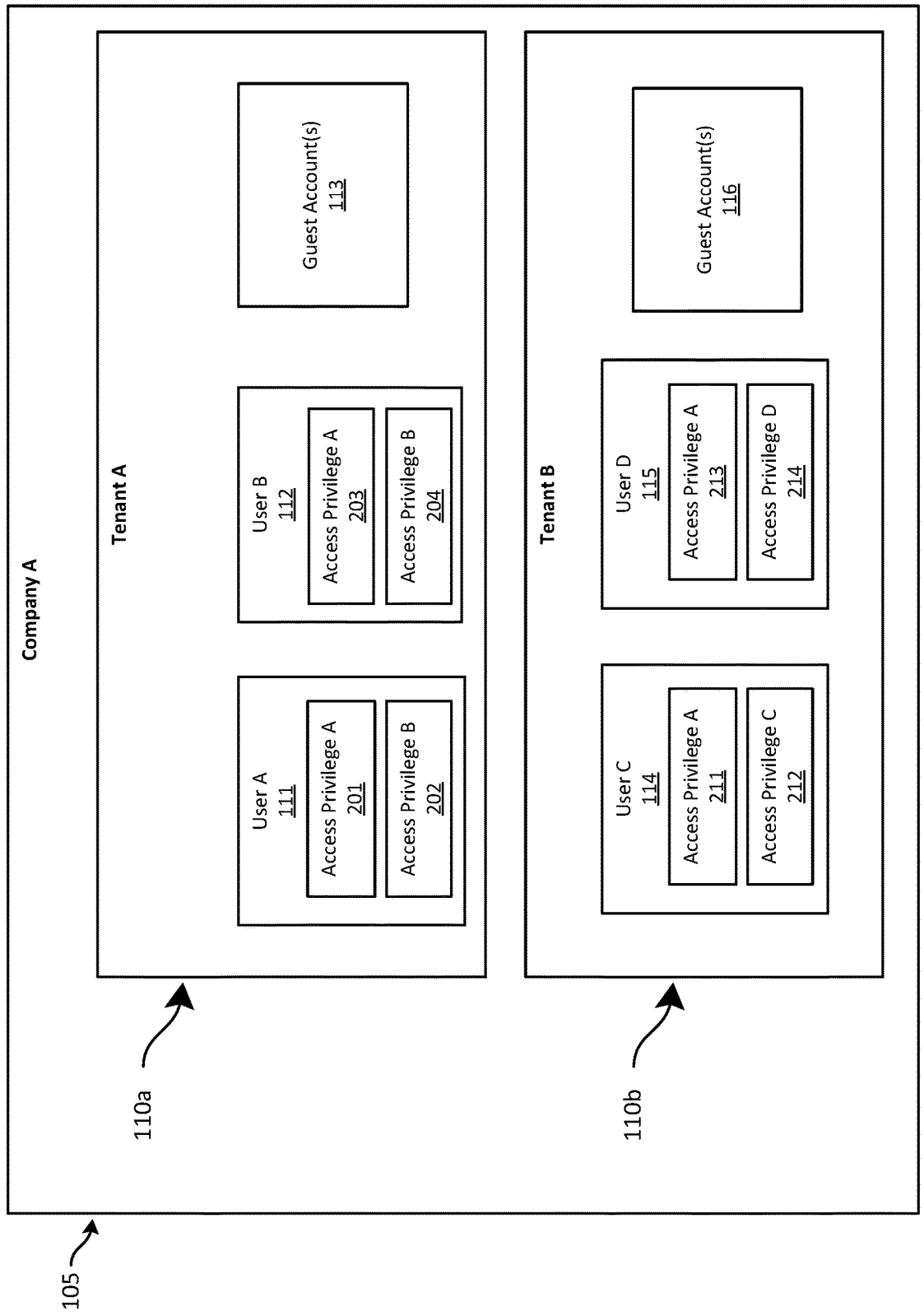
FIG. 2 is a diagram illustrating an example of software licenses being assigned to users of a multi-tenant organization.

FIG. 2 illustrates an example of access privileges having been assigned to users of a multi-tenant organization. FIG. 2 illustrates a diagram of the first organization 105 from FIG. 1 in which access privileges have been assigned to each of the user accounts. In this example, user accounts may be assigned access privileges that permit the user associated with the user account to access one or more of software products A, B, C, and D. The access privileges may include software licenses for software products A, B, C, and D if these software products require a license. In the example illustrated in FIG. 2, the user account 111 of User A has been assigned an access privilege 201 to a Product A, and an access privilege 202 to Product B. The user account 112 of User B has been assigned an access privilege 203 to Product A, and an access privilege 204 to Product B. The user account 114 of User C has been assigned an access privilege 211 to a Product A, and an access privilege 212 to Product C. The user account 115 of User D has been assigned an access privilege 213 to Product A, and an access privilege 214 to Product D. The examples that follow will illustrate some of the challenges that may arise when a user associated with one tenant attempts to collaborate with a user associated with a different tenant and/or a user attempts to access a resource associated with a different tenant or perform an operation by a data processing system using a resource or application associated with a different tenant.

Figure 3:
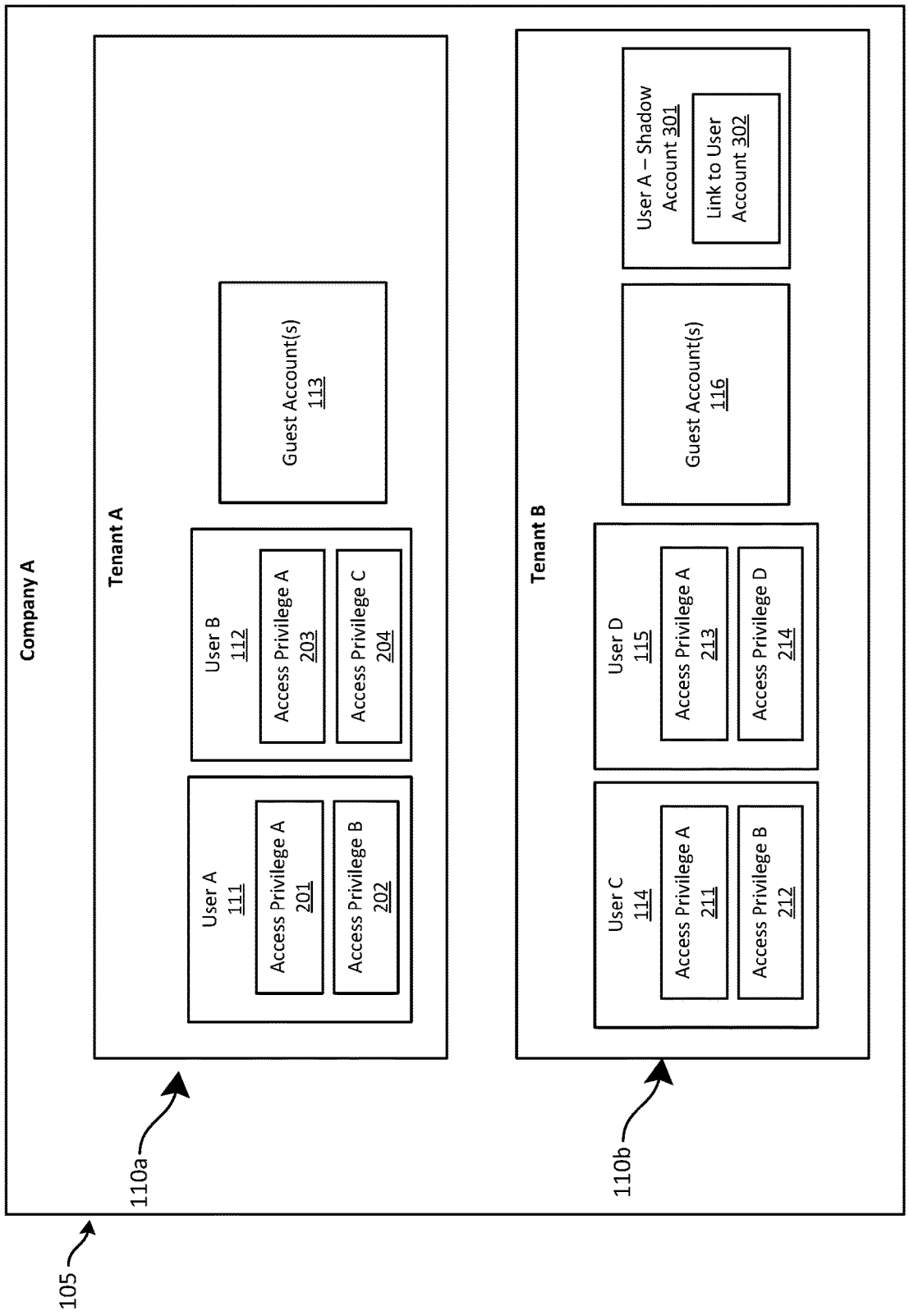
FIG. 3 is a diagram illustrating an example of users attempting to access content across tenants within an organization.

FIG. 3 illustrates an example in which User C from the second tenant 110b of the organization 105 invites User A from the first tenant 110a of the organization to collaborate on a project. However, User A and User C are in separate divisions which each are associated with their own respective tenant of the access management service 135. This can present a challenge from both an authentication standpoint and a licensing standpoint. A user may only gain access to content associated with a tenant of the access management service 135 if the user has a user account and can be authenticated by the access management service.

To permit a user to access content in another tenant of an organization that is not the user's home tenant, an administrator may provision a user account in the other tenant. In the example illustrated in FIG. 3, a duplicate user account 301 (also referred to as a "shadow account") may be created for User A in the second tenant 110b. The duplicate user account 301 allows User A to be authenticated and access content in the second tenant 110b. The duplicate user account 301 may be mapped or linked to the user account 111 of User A in first tenant 110a. The access management service may be configured to allow the User A to be authenticated according to user profile information associated with user account 111 when User A attempts to access content in the tenant associated with the second tenant 110b of the organization. This solution overcomes the access challenges posed by having users in an organization spread out over multiple tenants but may cause other serious difficulties for administrators with respect to licensing of resources.

FIG. 11 illustrates an example of user account data representing the user account 111 and the shadow account 301 of User A. The user account data, and other resources associated with a tenant, may be stored in separate directory structures by the access management service 135 that are isolated from one another such that resources maintained in one tenant are not directly accessible in another tenant. The user account data may include an object identifier which is a unique identifier used by the access management service 135 for referencing the user account data associated with an account. The user account data may also include a tenant identifier which is a unique identifier used by the access management service 135 to identify the tenant with which the user account data is associated. The user account data may include additional information, such as a username that the user may use for authentication purposes and which may be used by other users to identify a particular user. The username is a human-readable identifier that may be used to refer to a user within applications and/or services managed by the access management service 135. The username may, in some implementations, be an email address or other alias for a user. The user account data may also include a name of the user. The user account data may also include a role or roles associated with the user, such as but not limited to member, administrator, or guest, and each role may have one or more associated access privileges. The user account data may also include authentication credentials, which can be used to authenticate the user for accessing a tenant and resources managed by the tenant. The authentication credentials may include a username and password, biometric information, and/or other authentication credentials that may be used to identify the user to the access management service 135. The shadow account 301 may not be associated with authentication credentials, and the access management service 135 may be configured to access the user account data identified in the linked account identifier attribute to determine which authentication credentials should be used to authenticate the user when the user accesses the shadow account 301.

The user account data may include an Alternate Security Identifier ("AltSecID") attribute (also referred to herein as a "linked account identifier") that can be set by the access management service 135 when the shadow account is created that links the shadow account user account data to user account data in another tenant managed by the access management service 135. FIG. 11 illustrates an example how the link 302 between the shadow account 301 and the user account 111 may be implemented. The linked account identifier includes two pieces of information: an identifier for the tenant in which the linked user account data is located, and an identifier of the user account data within the tenant. In the example illustrated in FIG. 11, the linked account identifier of the shadow account 301 comprises the identifier for the first tenant 110a, which is "128765554" and the identifier of the user account data associated with user account 111 in the first tenant 110a, which is "190112124575933." The access management service 135 can use this information to look up the user account data associated with the shadow account 301 in tenant 110a.

When a shadow account is created in a first tenant for a user having a user account in a second tenant, the access management service 135 may set AltSecID attribute of the shadow account to include a tenant identifier of the second tenant, and a unique user identifier assigned to the user's user account data in the second tenant. When a nested license check is performed on the shadow account, the access management service 135 can recognize that the shadow account is a shadow account in response to the AltSecID attribute being set. The access management service 135 can access the user account data in the director of the second tenant using on the tenant identifier and the unique identifier assigned to the user account. Once the user account data has been located in the second tenant, the access management service 135 may determine whether the user account data is associated with any access privilege attributes, which may include license information for resources for which the user is permitted to access. The access management service 135 may optionally determine whether the first and second tenants are part of a same organization. The access management service 135 can determine whether the first and second tenants are part of the same organization based on tenant attribute information stored in the respective directory of each of the tenants.

In some implementations, the creation of the shadow account for a user may be automated by the access management service 135 for cross-tenant access within the same organization. Returning to the example illustrated in FIG. 3, User C may send an invitation to User A via email or via other means that provides a link for User A to access the resource in the second tenant 110b. In some implementations, User C may be presented with an option to create a user account for User A (or any other Users invited to collaborate with User C) in the second tenant 110b in response to the access management service 135 determining that the invited User does not have a user account with the second tenant 110b in which User C is homed. User C may specify an email address, an alias, or other identifier for User A that the access management service 135 may use to lookup User A in the directory of the tenant associated with the second tenant 110b. In response to determining that User A does not have a user account with the second tenant 110b of the organization 105, the access management service 135 may search for a user having a user account in other tenants of the access management service 135 that are associated with the same organization (e.g., organization 105 in the example illustrated in FIG. 3). If a matching user account is found in another tenant associated with the same organization, the access management service 135 may be configured to provision a shadow account for the user in the tenant in which the shared resource is located (e.g. the second tenant 110b in the example illustrated in FIG. 3). The shadow account may be linked to the primary user account in the tenant in which the user for whom the new account has been provisioned is located. Thus, the access management service 135 may be automatically generate the shadow account 301 in response to User A being invited to collaborate using a resource in the tenant associated with the second tenant 110b or in response to User A accepting the invitation to access the resource. The access management service 135 creates the shadow account 301 and configures the shadow account 301 to reference the primary user account 111 of User A via the link 302.

In the examples illustrated in FIGS. 2 and 3, a user may have access to one or more software products A, B, C, and D. These software products may be software applications that are external to the tenant, such as cloud-based applications provided by the SaaS providers 130a and 130b or may be internal applications that are homed within a particular tenant. This software may require that a license be purchased in order to access the software. In single tenant organizations, this does not present a problem. However, in multi-tenant organizations, a user may have a primary user account in a home tenant and one or more shadow accounts in other tenants associated other divisions or sub-entities of the organization. This can create significant problems for administrators who must manage access privileges for users across multiple tenants in large organizations.

Software licenses in particular may be problematic, because a user may need to access a resource or perform an operation by a data processing system using a resource across multiple tenants that requires a software license to access that software. The software licenses are typically assigned to a user account in one tenant and cannot be used to access that software in another tenant, even though both tenants are part of the same organization. To overcome this problem, administrators must obtain additional licenses to associate with the user's user accounts in each tenant in which the user require access to a particular licensed software application. Administrators may purchase these licenses at substantial cost and/or may negotiate with software providers to obtain free or discounted software licenses to assign to user accounts of users that require access to that software across multiple tenants of the organization. The nested access privilege check techniques disclosed herein may be used to avoid this need to obtain and maintain multiple software licenses for a single user across multiple tenants of an organization.

In a conventional implementation of an access management service 135, the access management service may be configured to provide an access privilege verification application programing interface (API) that provides an interface for applications to determine whether a user is permitted to access a particular application. The application may submit a request to the access management service 135 via the API that includes information that identifies the application and the user requesting access to the application. The information identifying the application may include a unique identifier for the application and may also include an identifier of the tenant with which the application is associated. The user information may include a username, user identifier, authorization credentials, and/or other information related to the user. The access management service 135 may be configured to look up the user account in the tenant associated with the request and determine whether the user account is associated with a software license or other access privilege indicating that the user is permitted to access the software. If the user account in that tenant does not have a valid software license or other access privilege indicating that the user may access the software, the user will be denied access to the software. However, a user may have multiple user accounts across multiple tenants, and one of those user accounts may have a valid license or other access privilege that indicates that the user is permitted to access the software. However, because the conventional access privilege check only checks the access privileges associated with the user account in a particular tenant, the user will still be denied access to the software application.

FIG. 3 illustrates an example of this concept. The User A has a primary user account 111 in the first tenant 110*a* of the organization 105 and a shadow account 301 in the second tenant 110*b* of the organization 105. The shadow account 301 may be linked or otherwise mapped back to the primary user account 111. The user account 111 is associated with access privileges 201 and 201 which permit the user to access software applications A and B, respectively, in the first tenant 110*a*. The shadow account 301 is not associated with any access privileges to access resources in the second tenant 110*b*. Therefore, if User A attempts to access software applications A or B using the shadow account 301 in the second tenant 110*b*, access will be denied, because the shadow account 301 is not associated with any access privileges for either of these software applications. In a conventional access management system without nested access privilege checks, an administrator would need to assign the shadow account 301 the required access privileges and/or software licenses in order or User A to access software applications A or B using the shadow account 301.

In organizations where there are potentially thousands of users, administrators may have to provision users accounts for these thousands of users across multiple tenants with proper access privileges and/or software license. While authentication issues can readily be overcome by creating shadow accounts for users to permit them to obtain access to content homed in other tenants of the organization, licensing issues still present a problem. Licenses are required to access the software provided by the cloud-based software providers, such as SaaS providers 130*a* and 130*b*. Typically, the software provided by such cloud-based providers enforce license checks as part of their authorization logic.

The techniques disclosed herein provide a nested access privilege check that overcomes the problems associated with the conventional access privilege checks in multi-tenant organizations. The nested access privilege check may be configured to determine whether a user account of a user that has requested access to a resource is associated a valid license or other access privilege for the resource. If the user account is associated with a valid license or other access privilege for the resource, the access management service 135 may grant access to the requested resource. Granting access to the resource may include sending an indication to the requested resource that the user should be permitted to access that resource. The indication may comprise an access token or other indication that the user is permitted to access the requested resource.

However, if the user account is not associated with a valid license or other access privilege, the access management service 135 can determine whether at least one other user account associated with the user is associated with a valid license or other access privilege for the requested resource. If another user account associated with the user is found that is associated with another tenant of the same organization and has a valid license and/or other access privilege for the resource, then the access management service 135 may grant access to the resource even though the user account that requested access to the resource is not associated with a valid license and/or other access privilege to access the resource. The access management service 135 may be configured to recursively check whether a user account and/or any user accounts associated with that user account have a valid license and/or access privilege for a particular resource.

Referring back to FIG. 3 to illustrate these concepts, the shadow account 301 of User A is linked or mapped to user account 111 of User A. If User A attempts to access either software applications A or B from the shadow account 301, the access management service 135 may first determine that the shadow account 301 does not have a valid license and/or access privilege for either of these software applications. However, the nested access privilege check can determine that the shadow account 301 is directly or indirectly mapped or linked to another user account that has a valid license or access privilege for the resource. The nested access privilege check can recursively check linked accounts until a valid license or other access privilege is discovered on one of the linked accounts or no more linked accounts are available to be checked. Once a valid license or access privilege has been found, the process may stop and the access management service 135 may grant access to the requested resource. In the example illustrated in FIG. 3, the shadow account 301 is linked to primary user account 111. The primary user account 111 may in turn be linked to one or more other user accounts (not shown) which may also be linked other user accounts associated with the user.

Figure 8:
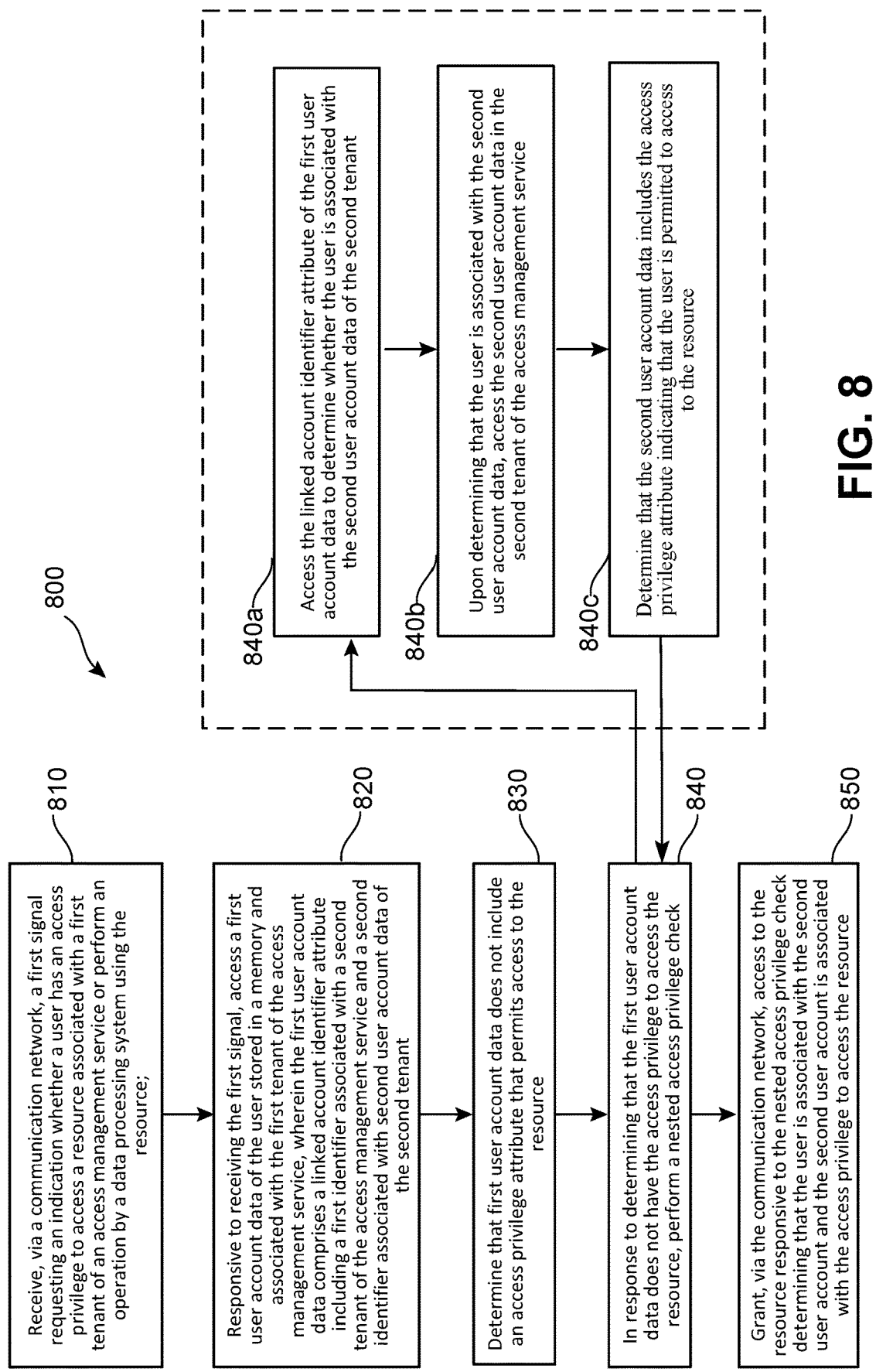
FIG. 8 is an example process for performing a nested access privilege check.

FIG. 8 is an example process 800 for performing a nested access privilege check to determine whether the user has a valid license and/or other access privilege to access a resource or perform an operation by a data processing system using a resource. The process 800 may be performed by the access management service 135 and/or may be performed by an application configured to determine whether a user is permitted to access the application.

The nested access privilege check may include determining that the linked user accounts are associated with a same organization. The nested access privilege check may also include determining that a second user account is associated with a tenant that belongs to the same organization as first user account. As discussed in the preceding examples, a user may have accounts associated with multiple tenants within an organization. Rather than assigning a software license and/or other access privilege to access a resource to each of these user accounts, an administrator for an organization may assign a license and/or other access privilege associated with the resource to just one of the linked accounts. In some implementations, the administrator may assign a license and/or other access privilege to a primary account associated with the user. In other implementations, the administrator may assign a license and/or an access privilege to a shadow account of the user that is mapped or linked to the primary user account. This approach can significantly reduce the number of software licenses that a multi-tenant organization may require, which can significantly reduce overhead required to allocation software licenses to a user, since only one user account needs to be updated, and significantly reduce costs, since only one copy of a license must be purchased for a user having multiple user accounts within the organization.

The process 800 may include an operation 810 in which a signal is received, via a communication network, requesting an indication whether a user has an access privilege to access to a resource associated with a first tenant of an access management service 135 or perform an operation by a data processing system using the resource. The requested resource may be a cloud-based application that is accessible by users of a tenant of the access management service 135. The application may, in response to an attempt by a user to access the cloud-based application, send a signal to the access management service 135. As discussed in the preceding examples, the application may communicate with the access management service 135 via an access privilege verification API which may transmit the signal to the access management service 135 requesting an indication whether the user who has attempted to access the application has a valid license to use the application. The application may be associated with a first tenant of the access management service 135, and the user requesting access to the application would require a license and/or other access privilege to access the requested application. The access management service 135 may maintain user accounts of users associated with a particular tenant as well as which access privileges are associated with each user account.

The process 800 may include an operation 820 in which responsive to receiving the first signal, first user account data of the user stored in a memory and associated with the first tenant of the access management service is accessed. The first user account data comprises a linked account identifier attribute including a first identifier associated with a second tenant of the access management service and a second identifier associated with second user account data of the second tenant. The access management service 135 can access the user account data referenced in the request received from the application to determine whether a license for the application is associated with the user account. Referring back to the example illustrated in FIGS. 3 and 11, if User A attempts to access software application A from the shadow user account 301, the access management service 135 will determine that User A does not have a license and/or access privilege associated with shadow account 301. In contrast, if User A attempted to access software application A from the primary user account 111, the access management service 135 can determine that user account 111 is associated with a valid access privilege 201 for software application A.

The process 800 may include an operation 830 in which a determination is made that a first user account associated with the user does not have an access privilege to access the resource by determining that first user account data stored in a memory of the access management service and associated with the first tenant of the access management service does not include an access privilege attribute that permits access to the resource. The process 800 may continue with stage 850 in response to determining that the user is associated with a valid license and/or access privilege for the requested resource.

The process 800 may include an operation 840 in which in response to determining that the first user account associated with the user does not have the access privilege to access the response, performing a nested access privilege check. Performing the nested access privilege check may include operation 840a in which the linked account identifier attribute of the first user account data is accessed to determine whether the user is associated with the second user account data of the second tenant. The process 800 may also include an operation 840b in which upon determining that the user is associated with the second user account data, the second user account data is accessed in the second tenant of the access management service, and an operation 840c in which a determination is made that the second user account data includes the access privilege attribute indicating that the user is permitted to access to the resource. Referring back to the example user account data for users accounts 111 and the shadow account 301 illustrated in FIG. 11, the shadow account 301 of User A in the second tenant 110b includes a linked account identifier that references the primary user account 111 of User A in the first tenant 110a. The linked account identifier in this example includes two pieces of information that can be used to identify the linked user account. The first part of the linked account identifier comprises an identifier for the tenant in which the linked user account resides and the second part of the linked account identifier comprises an identifier for the user account data in that tenant. In the example illustrated in FIG. 11, the linked account identifier of the shadow account 301 comprises the identifier for the first tenant 110a, which is "128765554" in this example. The second part of the linked account identifier of the shadow account 301 comprises the identifier of the user account data associated with user account 111 in the first tenant 110a, which is "190112124575933" in this example. The access management service 135 may access the user account data associated with user account 111 using the linked account identifier and may access the access privilege attributes associated with the user account data to determine whether the user account is associated with any access privileges. In the example illustrated in FIG. 11, the primary user account 111 of user A is associated with Access Privilege A 201 and Access Privilege B 202. User A has attempted to access software application A from the shadow account 301 in this example. The nested access privilege check performed by the access management service 135 has determined that the User A has a license to access software application A on the primary user account 111, and thus, the access management service 135 will grant the shadow account 301 of user A access to the software application A in tenant 110*b* of the organization.

The process 800 may include an operation 850 in which access to the resource is granted via the communication network responsive to the nested access privilege check determining that the user is associated with the second user account and the second user account is associated with the access privilege to access the resource. The access management service 135 may send a signal to the application that the user has a valid license or other access permission associated with a second user account. In the example illustrated in FIG. 3, the shadow account 301 associated with User A is mapped via link 302 to the user account 111 associated with the first tenant 110*a*. The first user account 111 is associated with the access privilege 201 for software application A, which may comprise a software license and/or other access privilege to access software application A. The access management service 135 may send a signal to the application indicating that the user should be granted access to the application via the license management API. If the user did not have a valid license for the application that the user attempted to access, a signal may be sent to the application that the user should not be granted access to the application. The application receiving such a signal may present a message to the user indicating that the user does not have a valid license for the application that the user attempted to access.

Figure 4:
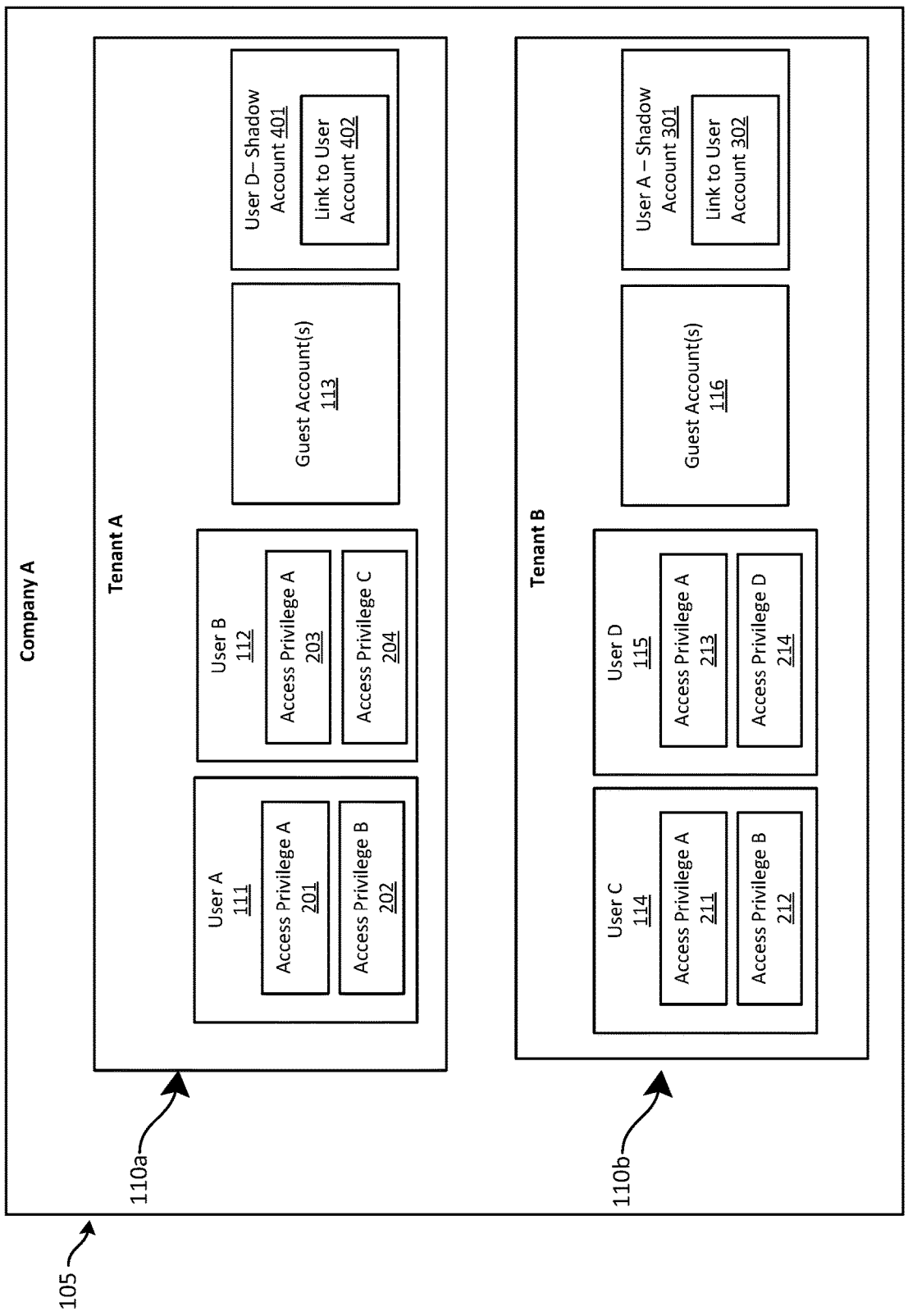
FIG. 4 is a diagram illustrating another example of users attempting to access content across tenants within an organization.
Figure 5:
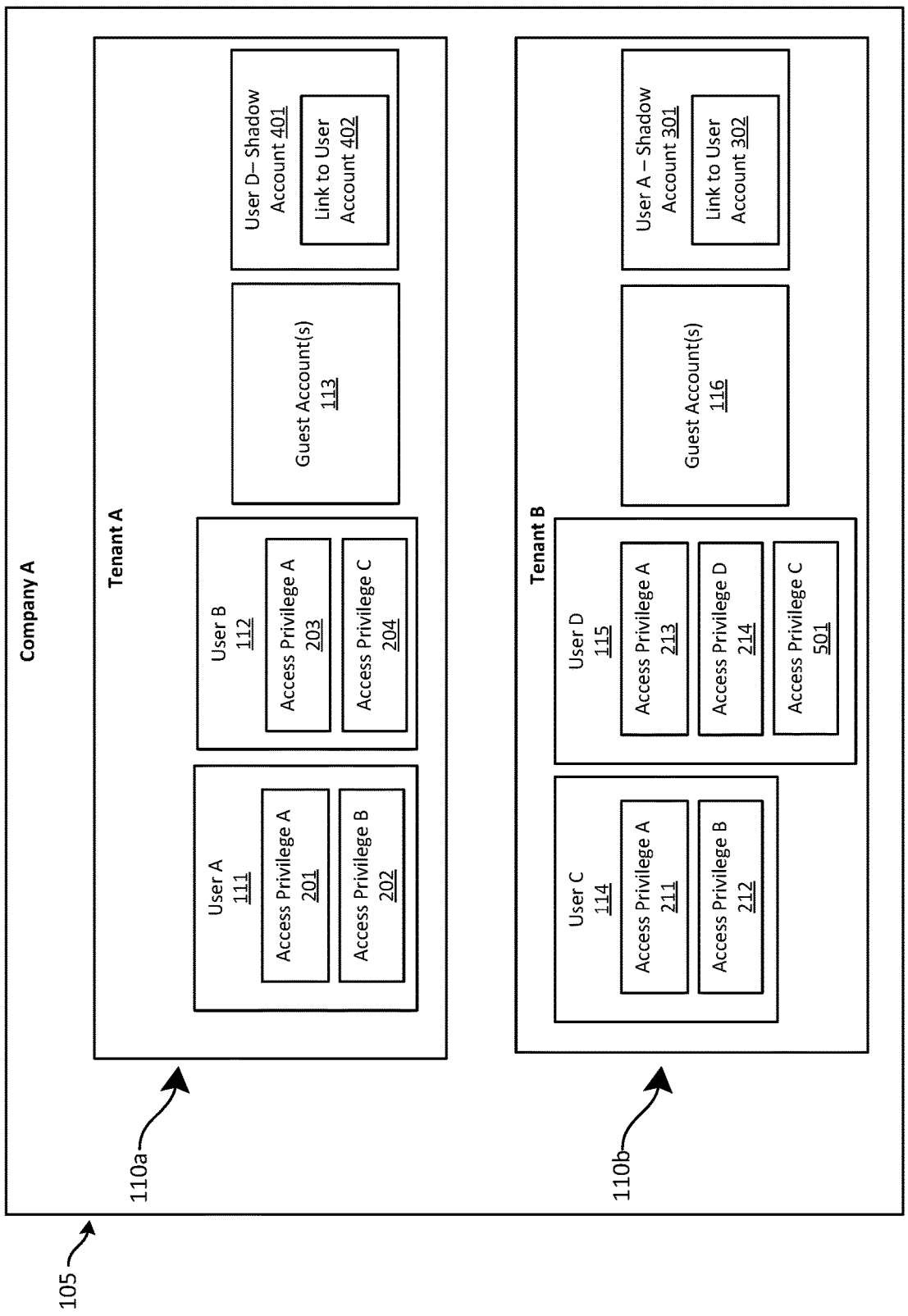
FIG. 5 is a diagram illustrating another example of users attempting to access content across tenants within an organization.

FIGS. 4 and 5 illustrates additional examples of the nested access privilege check being performed for cross-tenant requests. In the example illustrated in FIG. 4, the User B invites User D to collaborate on a project that requires User D to have access to software product C. User D is provided with a shadow account 401 in the first tenant 110*a* of the organization 105. The shadow account 401 includes a link 402 to the primary user account 115 of User D in the second tenant 110*b*. The shadow account 401 is not associated with any access privileges for any internal or external resources associated with the first tenant 110*a*. In the example illustrated in FIG. 4, the nested access privilege check will deny User D access to the software application C. Neither the shadow account 401 nor the primary user account 115 of User D has a license or other access privilege for software application C. In contrast, in FIG. 5, the user account 115 of User D includes an access privilege 501 for software application C. In this example, the nested access privilege check will grant User D access to the software application C via the shadow account 401, because the primary user account 115 of User D includes a software license and/or other access privilege to access software application C.

Figure 6:
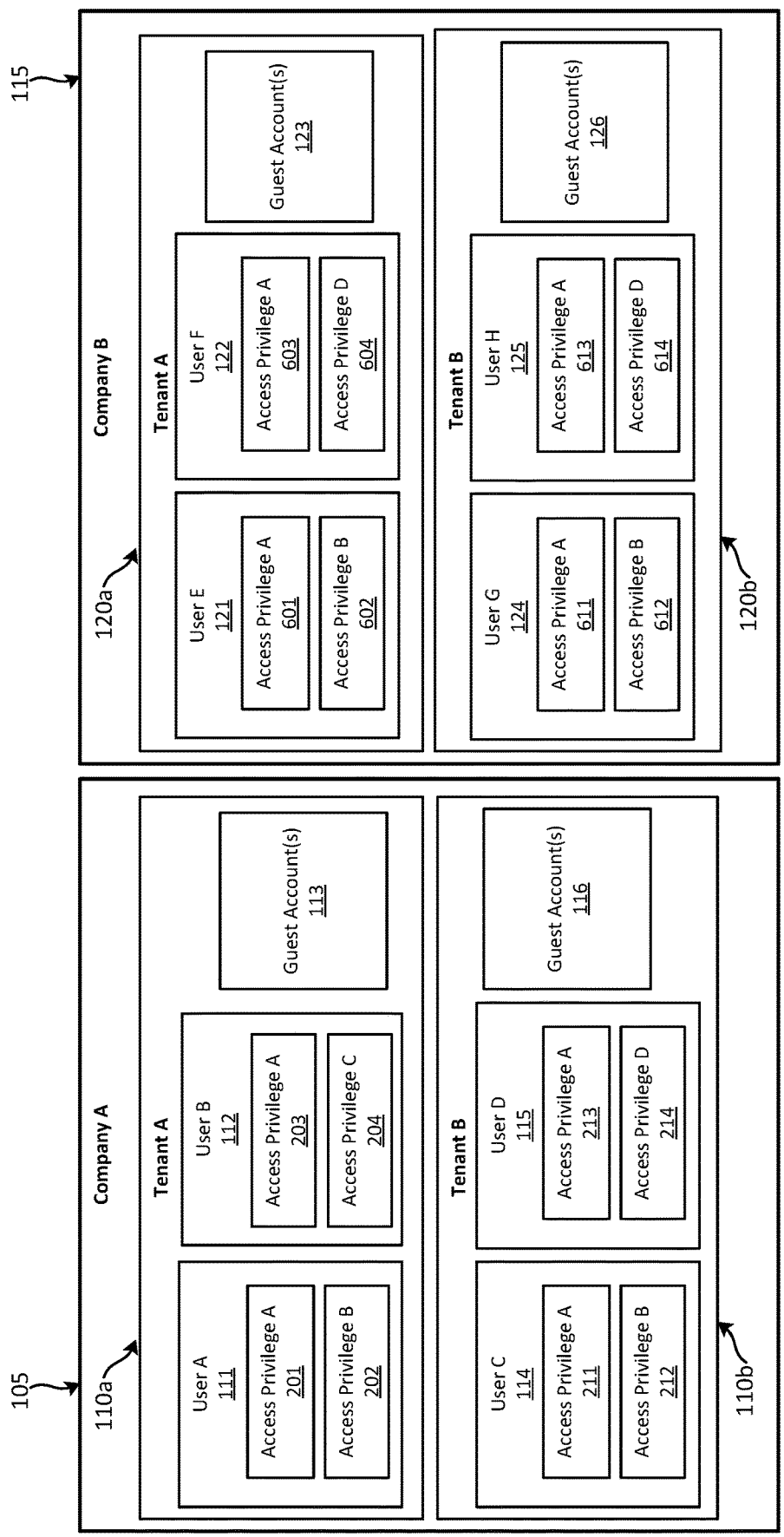
FIG. 6 is a diagram illustrating an example of users attempting to access content across tenants and across organizations.

FIG. 6 illustrates an example in which the nested access privilege check is applied to a cross-tenant request where the two tenants are parts of different organizations. The example illustrated in FIG. 6 illustrates access privileges associated with users in the second organization 115 include access privileges. The user account 121 of User E is associated with access privilege 601 to access application A and with access privilege 602 to access Application B. The user account 122 of User F is associated with access privilege 603 to access Application A and with access privilege 604 to access Application D. The user account 124 of User G is associated with access privilege 611 to access Application A and access privilege 612 to access Application B. The user account 125 associated with User H is associated with access privilege 613 associated with access privilege 613 to access Application A and with access privilege 614 to access Application D.

In this example, User D of the first organization 105 invites user E from the second organization 115 to collaborate on a project using software application A. Users D and E are associated with different organizations. Even if a shadow account were created for User E in the second tenant 110*b* of the organization 105, the nested access privilege check will not grant User E access to software access A in the second tenant 110*b*. User E has an access privilege 601 to access application A in the user account 121, but because the access privilege is associated with a different organization than the one in which the User E has attempted to access application A, User E would not be permitted to access application A using a shadow account in the tenant associated with the second tenant 110*b*.

Figure 7:
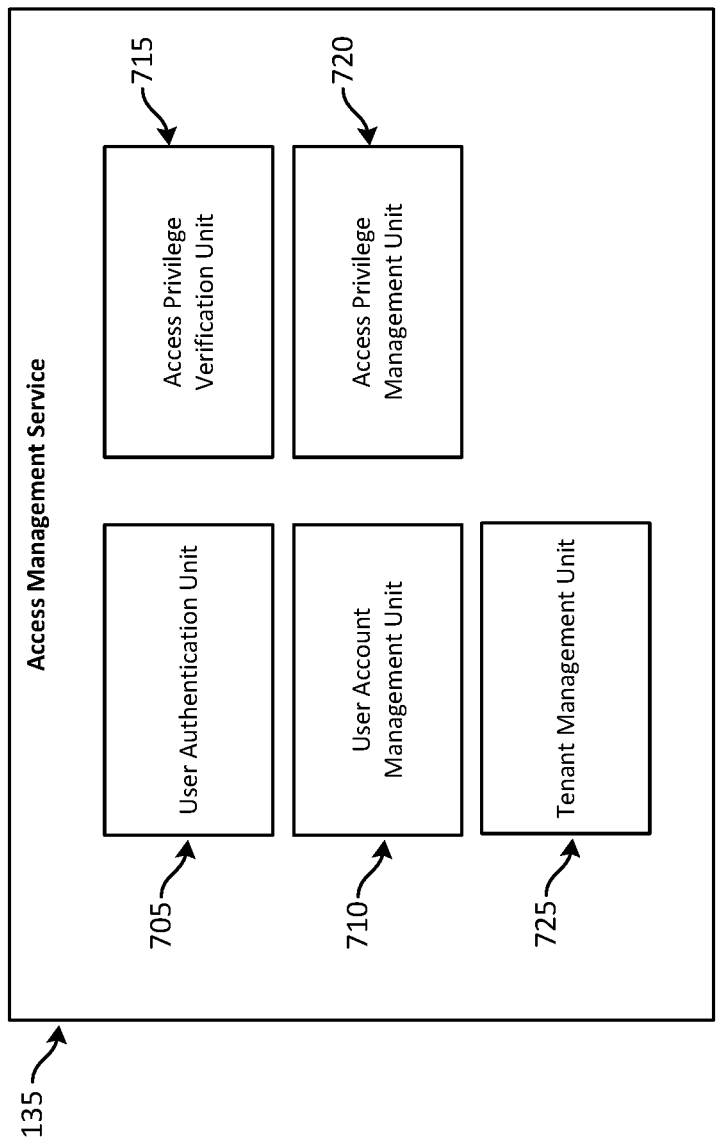
FIG. 7 is a block diagram of an example implementation of the access management service.

FIG. 7 is a block diagram of an example implementation of the access management service that may be used to implement the access management service 135. The access management service may include a user authentication unit 705, a user account management unit 710, an access privilege verification unit 715, an access privilege management unit 720, and a tenant management unit 725. The functionality of the access management service 135 may be implemented by processor-executable instructions stored in a memory of a computing device. The functionality of the access management service 135 may be implemented as a cloud-based service that may be accessed by a network connection over the Internet or via one or more public and/or private networks.

The tenant management unit 725 may be configured to provide a user interface that enables an administrator for an organization to set up and/or manage a tenant in the access management service 135. As discussed in the preceding example, a tenant may represent an entire organization. The tenant may be associated with a sub-entity of an organization, such as a division of a company, and an organization may have more than one tenant that each represents a sub-entity of the organization.

The user authentication unit 705 may be configured to authenticate a user with a tenant of the access management service 135 using various authentication techniques, including a password, a personal identification number (PIN), one or more biometric parameters (e.g. fingerprint, facial recognition, and/or other biometric parameters). The user authentication unit 705 may be configured to determine that the user account is a shadow account mapped to a user account associated with another tenant. If the shadow account is mapped to a user account in another tenant, the user authentication unit 705 may be configured to utilize the authentication parameters associated with the user account in the other tenant to authenticate the user. When authenticating attempting to access a shadow account, the user authentication unit 705 may be configured authenticate the user using credentials that the user would use to access their primary account. For example, referring back to FIG. 3, User A may be prompted to provide access credentials when attempting to access an application or other resource associated with the second tenant 110*b* using the shadow account 301. User A may provide their access credentials for accessing content in the tenant associated with the first division 110*a* of the organization. The user authentication unit 705 may authenticate the user using the credentials associated with the primary user account 111 of the first division 110*a* but the authentication unit 705 may provide an access token associated with the second tenant 110b to the application or other resource for which the user requested access. The cross-tenant authentication process may be completely transparent to the application or other resource for which the user requested access. The application or resource may be not aware that the user has been authenticated using credentials associated with a user account in another tenant of the access management service 135.

The user account management unit 710 may be configured to provide a user interface through which an administrator of a tenant of the access management service 135 may set up and/or configure user accounts. The user account management unit 710 may provide the administrator with the ability to set up member accounts and guest accounts. Users with member accounts have the ability to create content in the tenant and to invite other users to collaborate on content. Users with guest accounts have more limited access to the resources of the tenant. Guest accounts may not be permitted to create new content and may not be permitted to invite other users to collaborate on content. The access management service 135 may be configured to limit the number of guest accounts that may be created for a particular tenant. In some implementations, the user account management unit 710 may limit the number of guest accounts such that the ratio of guest accounts to member accounts does not exceed more than a predetermined threshold. The shadow accounts discussed in the preceding examples are created as member accounts due to the limitations imposed on guest accounts. The user account management unit 710 may also be configured to suspend or delete user accounts as well as remove a mapping back to another user account.

The access privilege verification unit 715 may be configured to determine whether a member account has a valid license for a software product in response to the user associated with the member account attempting to access the internal or external software application associated with a tenant of the access management service 135. The access privilege verification unit 715 may also be configured to perform a nested license check to determine whether the user account is associated with another user account that is associated with a valid license for the software product. The access privilege verification unit 715 may be configured to perform a nested license check for one or more user accounts that are mapped or linked to a member user account where the one or more user accounts are associated with the same organization. As discussed in the preceding examples, an organization may include more than one tenant in the access management service. The nested license check permits a user having user accounts in multiple tenants to be assigned a license for a particular software application in one of these tenants and to use this license to access this software application when working in another tenant associated with the same organization. This avoids the administrators of these tenants from having to obtain a duplicate license for the user in each tenant in which the user may access the software application. The access privilege verification unit 715 does not permit licenses associated with users accounts from another organization to be used to access content. This prevents users from circumventing licensing requirements by creating a shadow account in a tenant for a user from a tenant of another organization and linking the shadow account with the user account in the other organization.

The access privilege verification unit 715 may also be configured to determine whether a guest license is available in response to a user associated with a guest account attempting to access the resource. If a group license is available from a pool of group licenses, the guest license may be temporarily allocated to the guest user account to permit the guest user to access a particular resource.

The access privilege management unit 720 may be configured to provide a user interface for administrators of a tenant to configure access privileges associated with user accounts including but not limited to software licenses. The access privilege management unit 720 may be configured to provide a user interface for adding new software licenses to a tenant, associating software licenses with user accounts, and/or to adding new guest licenses to the tenant. The access privilege management unit 720 may also be configured to remove licenses from the tenant and/or from a user account. The licenses removed from a user account may be placed in a pool of licenses that may be associated to member user accounts of the tenant. The access privilege management unit 720 may also be configured to provide a user interface for administrators to define user groups and to assign pools of licenses that may be utilized by users from the user group.

Examples of the operations illustrated in the flow charts shown in FIG. 8 are described in connection with FIGS. 1-7. It is understood that the specific orders or hierarchies of elements and/or operations disclosed in FIG. 8 is an example approach. Based upon design preferences, it is understood that the specific orders or hierarchies of elements and/or operations in FIG. 8 may be rearranged while remaining within the scope of the present disclosure. FIG. 8 presents elements of the various operations in sample orders and are not meant to be limited to the specific orders or hierarchies presented. Also, the accompanying claims present various elements and/or various elements of operations in sample orders and are not meant to be limited to the specific elements, orders, or hierarchies presented.

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
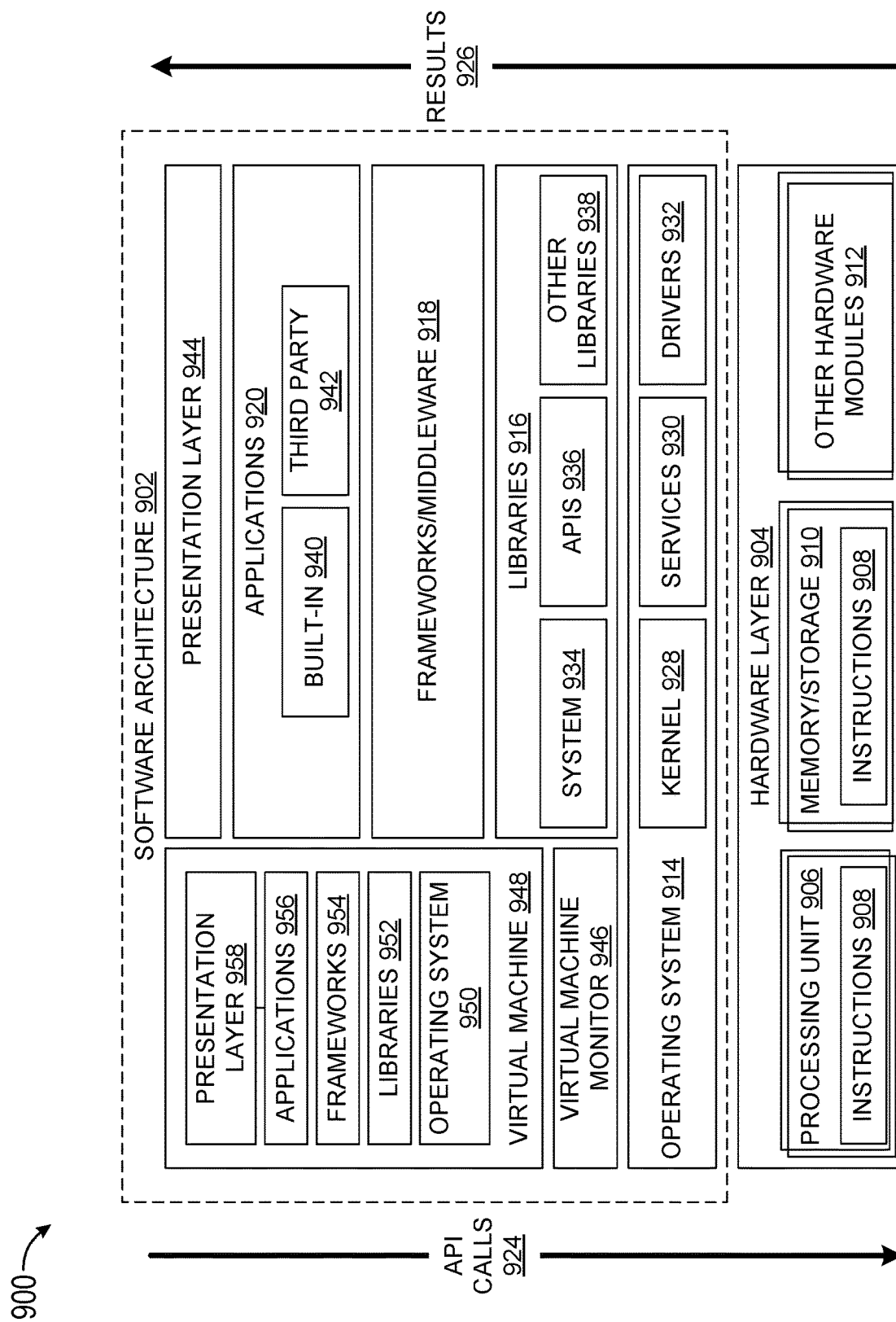
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 914, libraries 952, frameworks 954, applications 956, and/or a presentation layer 958.

Figure 10:
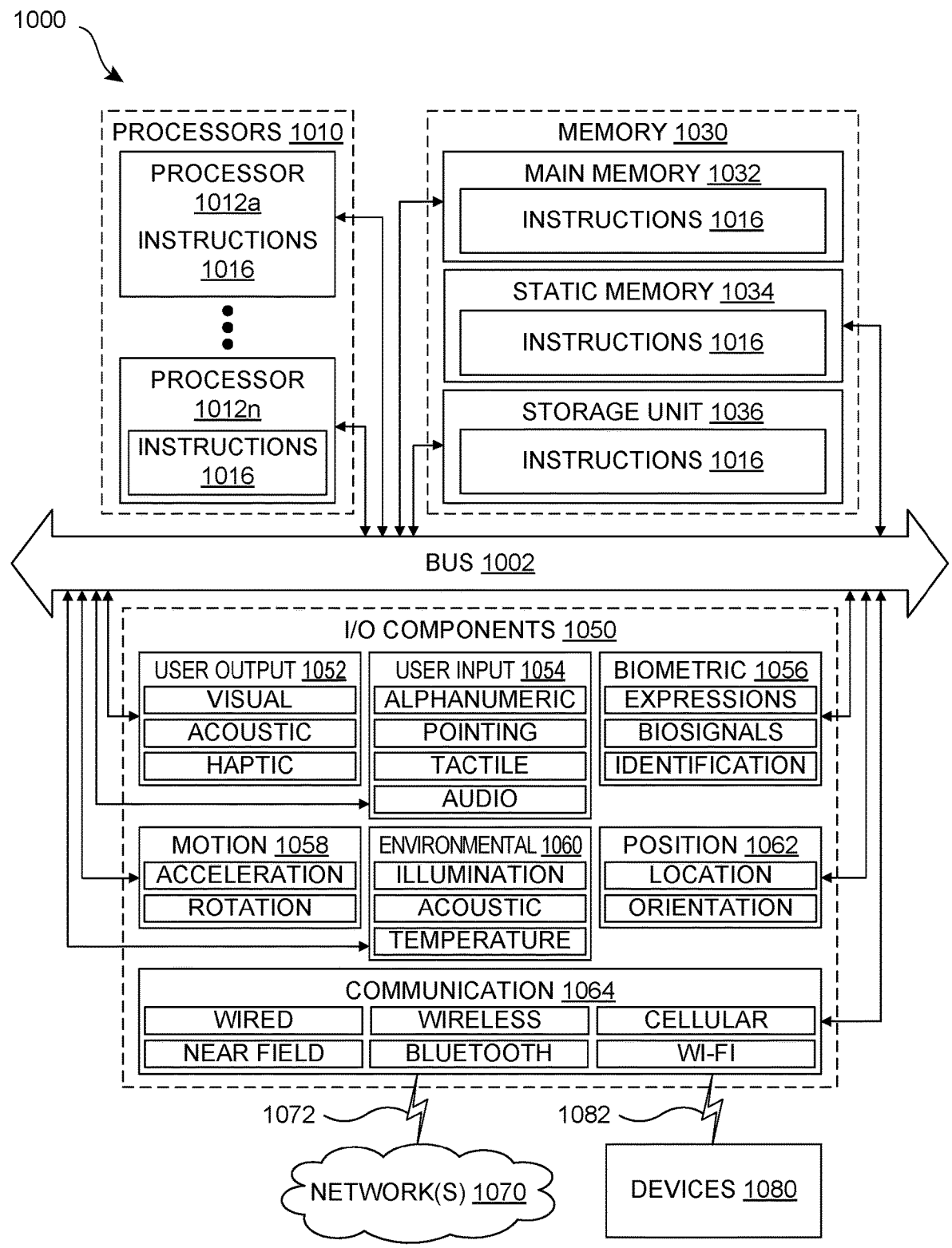
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items: Item 1. 1. A computing device comprising: a processor; and a computer-readable medium storing executable instructions for causing the processor to perform operations comprising: receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

Item 2. The computing device of item 1, wherein the resource managed by the access management service comprises an application for which the access management service manages access privileges to access the application, and wherein the instructions for receiving the first signal requesting an indication whether the user further comprise instructions configured to cause the processor to perform operations comprising: receiving the first signal via an access privilege verification Application Programming Interface (API) associated with the access management service.

Item 3. The computing device of item 2, wherein the instructions for granting access to the resource further comprise instructions configured to cause the processor to perform operations comprising: sending a second signal to the application via the access privilege verification API indicating that should be granted access to the application in response to the user being associated with a second user account that has the access privileged for the resource.

Item 4. The computing device of item 1, further comprising instructions configured to cause the processor to perform operations of: determining whether the first tenant and the second tenant are part of a same organization; and responsive to a result of the nested access privilege check, granting access to the resource responsive to the nested access privilege check determining that the user is associated with the second user account, the second user account is associated with the access privilege to access the resource, and the first tenant and the second tenant are part of the same organization.

Item 5. The computing device of item 1, further comprising instructions configured to cause the processor to perform operations of: determining that the user does not have a user account associated with the first tenant responsive to receiving the request from the user; determining that the user has the second user account associated with the second tenant; and creating the first user account with the first tenant responsive to determining that the user does not have a user account associated with the first tenant and that the user has the second user account with the second tenant.

Item 6. The computing device of item 5, further comprising instructions configured to cause the processor to perform operations of: linking the first user account to the second user account in the access management service.

Item 7. The computing device of item 5, wherein the instructions for creating the first user account responsive to determining that the user does not have a user account associated with the first tenant further comprise instructions configured to cause the processor to perform the operations of: creating a member account for the first user that is not associated with any access privileges to access resources associated with the first tenant.

Item 8. The computing device of item 1, wherein the instructions for performing the nested access privilege check further comprise instructions for causing the processor to perform the operations of: determining that the first user account of the user is associated with a plurality of user accounts managed by the access management service; determining whether a respective one of the plurality of user accounts is associated with an access privilege to access the resources; and determining that the user is associated with a second user account that is associated with the access privilege to access the resource responsive to a respective one of the plurality of user accounts being associated with the access privilege.

Item 9. A method performed by an access management service, the method comprising: receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

Item 10. The method of item 9, wherein the resource managed by the access management service comprises an application for which the access management service manages access privileges to access the application, and wherein receiving the first signal comprising the request from the user comprises: receiving the first signal from the application via an access privilege verification Application Programming Interface (API) associated with the access management service.

Item 11. The method of item 10, wherein granting access to the resource further comprises: sending a second signal to the application via the access privilege verification API indicating that the user should be granted access to the application in response to the user being associated with a second user account that has the access privileged for the resource.

Item 12. The method of item 9, further comprising: determining whether the first tenant and the second tenant are part of a same organization; and responsive to a result of the nested access privilege check, granting access to the resource responsive to the nested access privilege check determining that the user is associated with the second user account, the second user account is associated with the access privilege to access the resource, and the first tenant and the second tenant are part of the same organization.

Item 13. The method of item 12, further comprising: determining that the user does not have an account associated with the first tenant responsive to receiving the request from the user; determining that the user has user account associated with the second tenant associated with the first tenant; and creating the first user account responsive to determining that the user does not have an account associated with the first tenant.

Item 14. The method of item 13, further comprising: linking the first user account to the second user account in the access management service.

Item 15. The method of item 9, wherein performing the nested access privilege check further comprises: determining that the first user account of the user is associated with a plurality of user accounts managed by the access management service; determining whether a respective one of the plurality of user accounts is associated with an access privilege to access the resources; and determining that the user is associated with a second user account that is associated with the access privilege to access the resource responsive to a respective one of the plurality of user accounts being associated with the access privilege.

Item 16. A memory device storing instructions that, when executed on a processor of a computing device, cause the computing device to provide an access management service on the computing device, by: receiving, via a communication network, a first signal requesting an indication whether a user has an access privilege to access a resource associated with a first tenant of an access management service or perform an operation by a data processing system using the resource; responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant; determining that first user account data does not include an access privilege attribute that permits access to the resource; in response to determining that the first user account data does not have the access privilege to access the resource, performing a nested access privilege check by: accessing the linked account identifier attribute of the first user account data to determine whether the user is associated with the second user account data of the second tenant; upon determining that the user is associated with the second user account data, accessing the second user account data in the second tenant of the access management service; and determining that the second user account data includes the access privilege attribute indicating that the user is permitted to access to the resource; and granting, via the communication network, access to the resource responsive to the nested access privilege check determining that the user is permitted to access to the resource.

Item 17. The memory device of item 16, wherein the resource managed by the access management service comprises an application for which the access management service manages access privileges to access the application, and wherein the instructions for receiving the signal comprising the request from the user further comprise instructions configured to cause the computing device to perform operations comprising: receiving the first signal from the application via an access privilege verification Application Programming Interface (API) associated with the access management service; and wherein the instructions for granting access to the resource further comprise instructions configured to cause the computing device to perform operations comprising: sending a second signal to the application via the access privilege verification API indicating that the user should be granted access to the application in response to the user being associated with a second user account that has the access privileged for the resource.

Item 18. The memory device of item 16, further comprising instructions configured to cause the computing device to perform the operations of: determining whether the first tenant and the second tenant are part of a same organization; and responsive to a result of the nested access privilege check, granting access to the resource responsive to the nested access privilege check determining that the user is associated with the second user account, the second user account is associated with the access privilege to access the resource, and the first tenant and the second tenant are part of the same organization.

Item 19. The memory device of item 18, further comprising instructions configured to cause the computing device to perform operations of: determining that the user does not have an account associated with the first tenant responsive to receiving the request from the user; determining that the user has user account associated with the second tenant associated with the first tenant; and creating the first user account responsive to determining that the user does not have an account associated with the first tenant.

Item 20. The memory device of item 19, further comprising instructions configured to cause the computing device to perform operations of: linking the first user account to the second user account in the access management service.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:
 a processor; and
 a computer-readable medium storing executable instructions for causing the processor to perform operations comprising:
  receiving, via a communication network, a first signal requesting an indication whether a user has an access privilege to access a resource associated with a first tenant of an access management service or perform an operation by a data processing system using the resource;
  responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant, wherein the second user account data of the second tenant is account data of the same user;
  determining that the first user account data does not include an access privilege attribute that permits access to the resource;
  in response to determining that the first user account data does not have the access privilege to access the resource, performing a nested access privilege check by:
   accessing the linked account identifier attribute of the first user account data to determine whether the user is associated with the second user account data of the second tenant;
   upon determining that the user is associated with the second user account data, accessing the second user account data in the second tenant of the access management service; and
   determining that the second user account data includes the access privilege attribute indicating that the user is permitted to access to the resource; and
  granting, via the communication network, access to the resource responsive to the nested access privilege check determining that the user is permitted to access to the resource.

2. The computing device of claim 1, wherein the resource managed by the access management service comprises an application for which the access management service manages access privileges to access the application, and wherein the instructions for receiving the first signal further comprise instructions configured to cause the processor to perform operations comprising:
 receiving the first signal via an access privilege verification Application Programming Interface (API) associated with the access management service.

3. The computing device of claim 2, wherein the instructions for granting access to the resource further comprise instructions configured to cause the processor to perform operations comprising:
 sending a second signal to the application via the access privilege verification API indicating that should be granted access to the application in response to the user being associated with a second user account that has the access privileged for the resource.

4. The computing device of claim 1, further comprising instructions configured to cause the processor to perform operations of:
 determining whether the first tenant and the second tenant are part of a same organization; and
 responsive to a result of the nested access privilege check, granting access to the resource responsive to the nested access privilege check determining that the user is associated with the second user account, the second user account is associated with the access privilege to access the resource, and the first tenant and the second tenant are part of the same organization.

5. The computing device of claim 1, further comprising instructions configured to cause the processor to perform operations of:
 determining that the user does not have a user account associated with the first tenant responsive to receiving the request from the user;
 determining that the user has the second user account associated with the second tenant; and
 creating the first user account with the first tenant responsive to determining that the user does not have a user account associated with the first tenant and that the user has the second user account with the second tenant.

6. The computing device of claim 5, further comprising instructions configured to cause the processor to perform operations of:
 linking the first user account to the second user account in the access management service.

7. The computing device of claim 5, wherein the instructions for creating the first user account responsive to determining that the user does not have a user account associated with the first tenant further comprise instructions configured to cause the processor to perform the operations of:
 creating a member account for the first user that is not associated with any access privileges to access resources associated with the first tenant.

8. The computing device of claim 1, wherein the instructions for performing the nested access privilege check further comprise instructions for causing the processor to perform the operations of:
 determining that the first user account of the user is associated with a plurality of user accounts managed by the access management service;
 determining whether a respective one of the plurality of user accounts is associated with an access privilege to access the resources; and
 determining that the user is associated with a second user account that is associated with the access privilege to access the resource responsive to a respective one of the plurality of user accounts being associated with the access privilege.

9. A method performed by an access management service, the method comprising:
    receiving, via a communication network, a first signal requesting an indication whether a user has an access privilege to access a resource associated with a first tenant of the access management service or perform an operation by a data processing system using the resource;
    responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant, wherein the second user account data of the second tenant is account data of the same user;
    determining that the first user account data does not include an access privilege attribute that permits access to the resource;
    in response to determining that the first user account data does not have the access privilege to access the resource, performing a nested access privilege check by:
        accessing the linked account identifier attribute of the first user account data to determine whether the user is associated with the second user account data of the second tenant;
        upon determining that the user is associated with the second user account data, accessing the second user account data in the second tenant of the access management service; and
        determining that the second user account data includes the access privilege attribute indicating that the user is permitted to access to the resource; and
    granting, via the communication network, access to the resource responsive to the nested access privilege check determining that the user is permitted to access to the resource.

10. The method of claim 9, wherein the resource managed by the access management service comprises an application for which the access management service manages access privileges to access the application, and wherein receiving the first signal comprising the request from the user comprises:
    receiving the first signal from the application via an access privilege verification Application Programming Interface (API) associated with the access management service.

11. The method of claim 10, wherein granting access to the resource further comprises:
    sending a second signal to the application via the access privilege verification API indicating that the user should be granted access to the application in response to the user being associated with a second user account that has the access privileged for the resource.

12. The method of claim 9, further comprising:
    determining whether the first tenant and the second tenant are part of a same organization; and
    responsive to a result of the nested access privilege check, granting access to the resource responsive to the nested access privilege check determining that the user is associated with the second user account, the second user account is associated with the access privilege to access the resource, and the first tenant and the second tenant are part of the same organization.

13. The method of claim 12, further comprising:
    determining that the user does not have an account associated with the first tenant responsive to receiving the request from the user;
    determining that the user has user account associated with the second tenant associated with the first tenant; and
    creating the first user account responsive to determining that the user does not have an account associated with the first tenant.

14. The method of claim 13, further comprising:
    linking the first user account to the second user account in the access management service.

15. The method of claim 9, wherein performing the nested access privilege check further comprises:
    determining that the first user account of the user is associated with a plurality of user accounts managed by the access management service;
    determining whether a respective one of the plurality of user accounts is associated with an access privilege to access the resources; and
    determining that the user is associated with a second user account that is associated with the access privilege to access the resource responsive to a respective one of the plurality of user accounts being associated with the access privilege.

16. A memory device storing instructions that, when executed on a processor of a computing device, cause the computing device to provide an access management service on the computing device, by:
    receiving, via a communication network, a first signal requesting an indication whether a user has an access privilege to access a resource associated with a first tenant of the access management service or perform an operation by a data processing system using the resource;
    responsive to receiving the first signal, accessing a first user account data of the user stored in a memory and associated with the first tenant of the access management service, wherein the first user account data comprises a linked account identifier attribute including a first identifier associated with a second tenant of the access management service and a second identifier associated with second user account data of the second tenant, wherein the second user account data of the second tenant is account data of the same user;
    determining that the first user account data does not include an access privilege attribute that permits access to the resource;
    in response to determining that the first user account data does not have the access privilege to access the resource, performing a nested access privilege check by:
        accessing the linked account identifier attribute of the first user account data to determine whether the user is associated with the second user account data of the second tenant;
        upon determining that the user is associated with the second user account data, accessing the second user account data in the second tenant of the access management service; and
        determining that the second user account data includes the access privilege attribute indicating that the user is permitted to access to the resource; and
    granting, via the communication network, access to the resource responsive to the nested access privilege check determining that the user is permitted to access to the resource.

17. The memory device of claim 16, wherein the resource managed by the access management service comprises an application for which the access management service manages access privileges to access the application, and wherein the instructions for receiving the signal comprising the request from the user further comprise instructions configured to cause the computing device to perform operations comprising:
  receiving the first signal from the application via an access privilege verification Application Programming Interface (API) associated with the access management service; and wherein the instructions for granting access to the resource further comprise instructions configured to cause the computing device to perform operations comprising:
  sending a second signal to the application via the access privilege verification API indicating that the user should be granted access to the application in response to the user being associated with a second user account that has the access privileged for the resource.

18. The memory device of claim 16, further comprising instructions configured to cause the computing device to perform the operations of:
  determining whether the first tenant and the second tenant are part of a same organization; and
  responsive to a result of the nested access privilege check, granting access to the resource responsive to the nested access privilege check determining that the user is associated with the second user account, the second user account is associated with the access privilege to access the resource, and the first tenant and the second tenant are part of the same organization.

19. The memory device of claim 18, further comprising instructions configured to cause the computing device to perform operations of:
  determining that the user does not have an account associated with the first tenant responsive to receiving the request from the user;
  determining that the user has user account associated with the second tenant associated with the first tenant; and
  creating the first user account responsive to determining that the user does not have an account associated with the first tenant.

20. The memory device of claim 19, further comprising instructions configured to cause the computing device to perform operations of:
  linking the first user account to the second user account in the access management service.

* * * * *